United States Patent [19]

Benson

[11] 4,308,032
[45] Dec. 29, 1981

[54] COMPACTED SAWDUST LOG AND METHOD AND APPARATUS FOR MAKING THE SAME

[76] Inventor: Toby T. Benson, 3115 St. Ann, Butte, Mont. 59701

[21] Appl. No.: 185,622

[22] Filed: Sep. 9, 1980

[51] Int. Cl.³ .............................................. C10L 5/44
[52] U.S. Cl. ......................................... 44/1 E; 44/2; 44/14; 44/10 B
[58] Field of Search ............... 44/1 E, 2, 10 B, 38, 44/40, 14; 53/173–175, 285, 266 R, 467; 206/803

[56] References Cited

U.S. PATENT DOCUMENTS

| | | | |
|---|---|---|---|
| 390,610 | 10/1888 | Macbrair | 44/10 B |
| 908,615 | 1/1909 | Sendlein | 44/40 |
| 930,526 | 8/1909 | Bloss | 44/40 |
| 1,113,478 | 10/1914 | Phillips | 44/40 |
| 1,194,333 | 8/1916 | Foreman | 44/14 |
| 1,199,999 | 10/1916 | Lucas | 44/10 B |
| 2,789,890 | 4/1957 | Stevens | 44/40 X |
| 2,863,741 | 12/1958 | Sorgi | 44/38 |
| 4,220,453 | 9/1980 | Holder | 44/10 B |

*Primary Examiner*—Carl F. Dees
*Attorney, Agent, or Firm*—Harvey B. Jacobson

[57] ABSTRACT

A synthetic log formed of a compacted comminuted and combustible material such as sawdust for use in fireplaces and wood burning stoves is handmade by filling a rolled paper tube with sawdust, compacting the sawdust in the rolled paper tube positioned within a support form structure, removing the form from around the paper tube and folding the paper tube to close off the ends to form a log. A kit for use in the method includes a means to form the paper tube and the support form structure which is an open pipe section longitudinally cut in half and hinged along one end to secure the halves together and provided with a locking means to close the other end about the paper tube which holds the combustible material.

8 Claims, 14 Drawing Figures

U.S. Patent  Dec. 29, 1981  Sheet 1 of 2  4,308,032
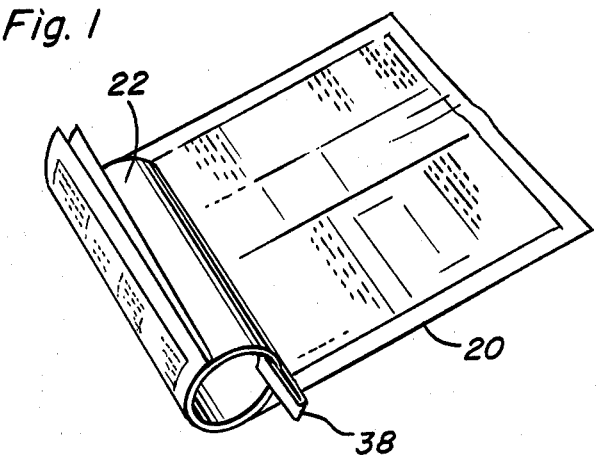
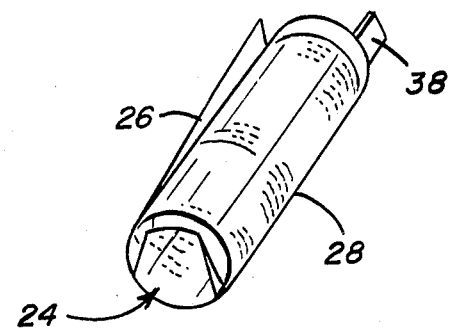
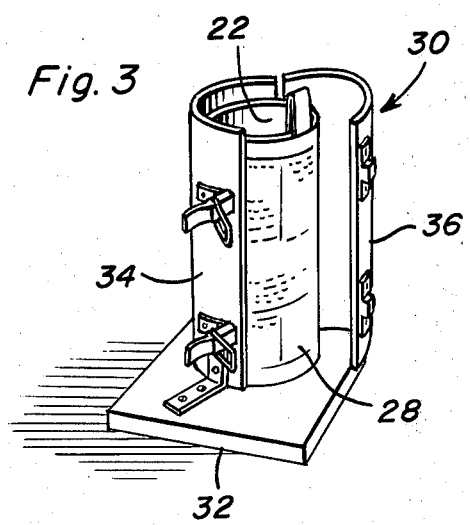
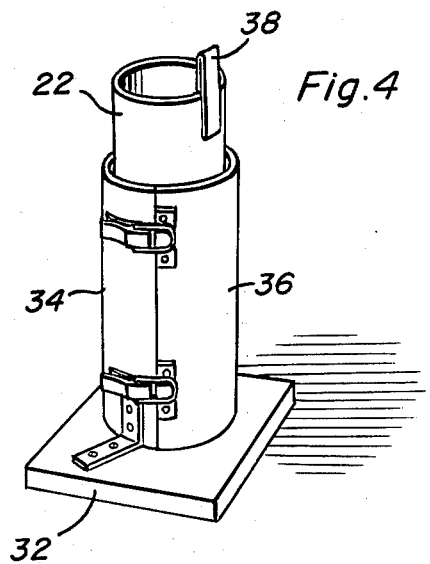
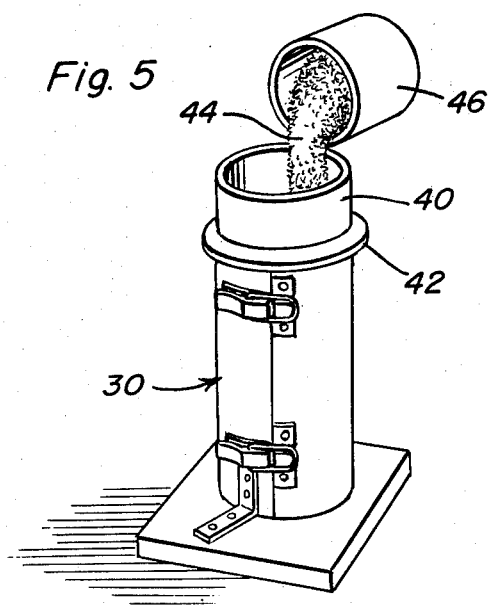
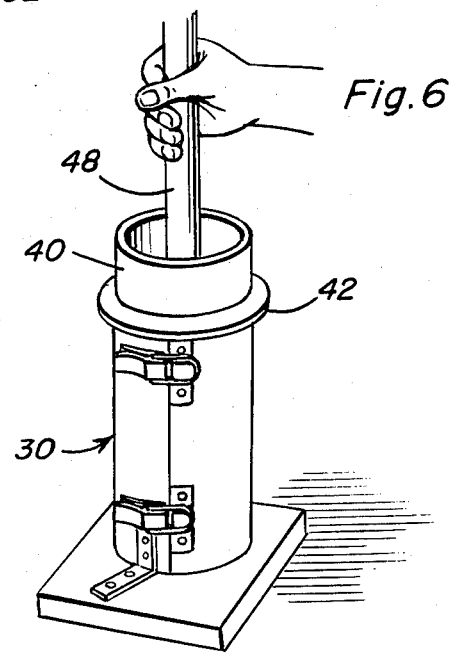

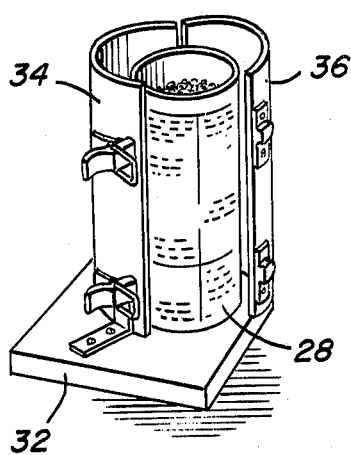
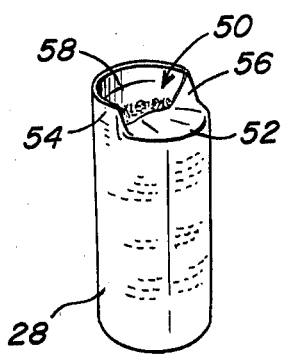
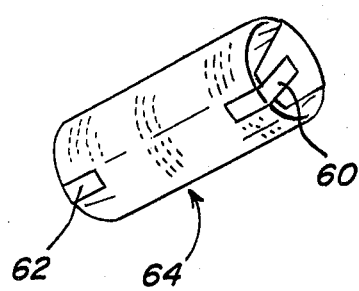
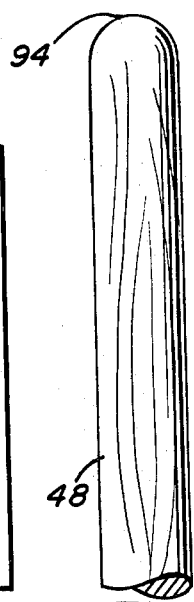
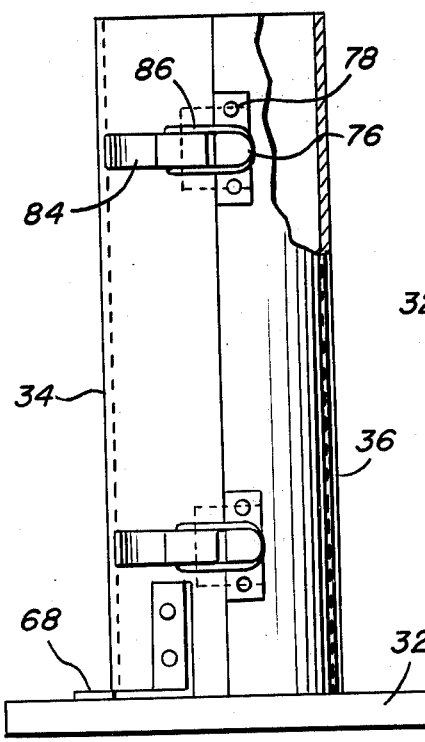
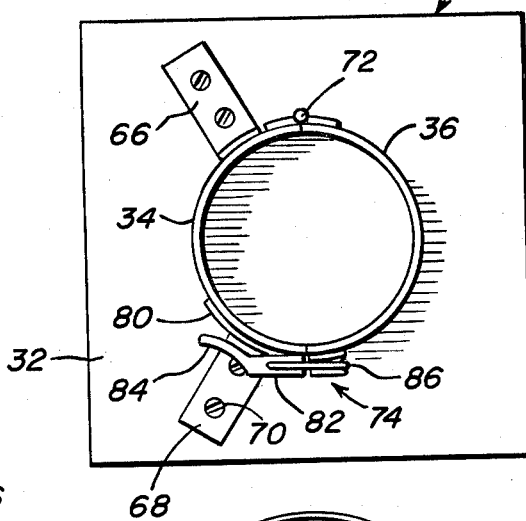
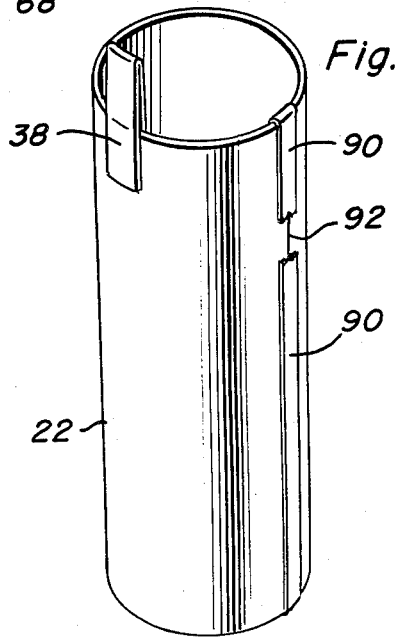
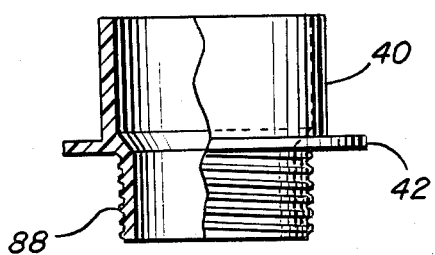

COMPACTED SAWDUST LOG AND METHOD AND APPARATUS FOR MAKING THE SAME

FIELD OF THE INVENTION

This invention relates to an artificial log adapted to be inserted into a wood burning stove, fireplace or furnace and which is formed from a compacted particulate and combustible material ordinarily characterized as waste, for example, sawdust. Also, the invention contemplates a method of making the artificial log in which the log is made by hand following several easy steps. Apparatus accessories utilized in the method can be inexpensively made and are easily used in the log making method.

DISCLOSURE STATEMENT

The rising costs of fossil fuels such as oil has greatly increased the demand for wood fuel as homeowners and others have replaced oil fuel furnaces and the like with wood burning stoves and furnaces. However, increased demand for wood fuel coincides with a decreasing availability of natural wood logs and accordingly the cost of wood fuel has risen drastically in the last several years. Furthermore, wood fuel is usually bought in substantially large quantities such that storage of the wood fuel can be a problem, especially for those who have wood burning fireplaces and stoves but do not have a large storage area outside the home. The cost of purchasing a quantity of wood logs in terms of cords becomes quite excessive, especially if the wood logs are only used sparingly during the year. Accordingly, a need has existed for a synthetic product satisfactory as a substitute for wood logs. The effort to produce a commercially acceptable synthetic fireplace log has been somewhat successful as several products have been placed on the market in recent years. Examples of patented synthetic logs, however, reach far back to the beginning of this century and extend throughout the present era. Examples of such patents include U.S. Pat. Nos. 1,199,999, issued Oct. 3, 1916; 1,747,919, issued Feb. 18, 1930; 2,475,766, issued July 12, 1949 and 3,726,651, issued Apr. 10, 1973.

Several of the above patents utilize waste material such as sawdust and paper for producing the synthetic wood log. The usage of such waste material is, of course, beneficial to the environment as waste products are recycled, and usage of such wastes is also economical as the waste product and the storage and transport thereof are less costly than is the expense of processing, transporting and storage of natural wood logs. However, in spite of the need for synthetic logs, and the production of several commercial products, a need still exists for a process of manufacturing synthetic logs inexpensively and which can be performed by individuals easily and when needed, eliminating the necessity of storing a large amount of wood logs, or buying synthetic logs at relatively high consumer prices, and yet produce a synthetic log which is long burning and gives off considerable heat. Two patented systems of forming synthetic fireplace logs include U.S. Pat. No. 3,986,845, issued Oct. 19, 1976 and U.S. Pat. No. 3,070,485, issued Dec. 25, 1962. However, both of these patents require complex machinery to mold a synthetic fireplace log and they are certainly not available to the public for use in their homes. Accordingly, a need still exists for a method of manufacturing a fireplace log which can be done easily by hand with minimal capital investment in which the apparatus utilized can be easily constructed and used.

SUMMARY OF THE INVENTION

Accordingly, it is an object of the present invention to provide a combustible synthetic log which will produce adequate heat when burned.

Another object of the present invention is to provide a combustible synthetic log which can be produced by hand at minimal expense.

Another object of the present invention is to provide a combustible synthetic log which is formed from combustible waste materials in particulate form which can be stored and transported in a minimum amount of space and at minimum cost.

Still another object of the present invention is to provide a method for producing a combustible synthetic log by hand in which the method steps are simple to follow and can be accomplished by individuals when a combustible log is needed to produce heat.

Still yet another object of the present invention is to provide a synthetic log production kit in which the accessories thereto are easy to construct and can be utilized by hand to produce the synthetic log of the present invention.

Briefly, these and other objects of the present invention are accomplished by rolling paper sheet into a tube, closing off one end of the tube, pouring combustible waste material such as sawdust into the tube and compacting the waste material therein to form a relatively hard solid synthetic log, continually filling and compacting the combustible material until the paper tube is substantially filled, closing off the other end of the paper tube and sealing both ends to produce a hard compacted synthetic log comprising compacted particulate combustible material wrapped in a paper covering. All of the above steps can be easily performed by hand at the site where the log is to be used. Further, a kit is provided for performing the method of producing the synthetic log, which kit includes a forming tube for rolling a sheet of paper into the tube which supports the compacted combustible solid and an outer tubular form support means which supports the paper tube during the compacting step. The kit can further include a funnel means and pouring means to direct the combustible material into the paper tube and a compacting means to compact the combustible particulate solid within the paper tube. All members of the kit can be easily manufactured from readily accessible materials and are easily used in the synthetic log forming process.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 1 through 9 illustrate specific steps in the formation of the synthetic log of the present invention and show the use of each of the kit components.

FIG. 10 is a front elevational view of the outer form support member of the kit which is utilized to support the paper tube during the pouring and compacting step of the invention, the outer support form being partly broken away and shown in section.

FIG. 11 is a top plan view of the outer support form of FIG. 10.

FIG. 12 is a cross-sectional view of the funnel member of the present invention utilized to direct the combustible particulate solid into the paper tube.

FIG. 13 is the paper tube forming means of the kit of the present invention.

FIG. 14 is an elevational view partly broken away and in section of the compacting means utilized in the method of the present invention.

DETAILED DESCRIPTION OF THE INVENTION

The synthetic log of the present invention is formed from a compacted particulate combustible material. The use of combustible sawdust is preferred, although other particulate combustible material can be utilized such as charcoal, paper, etc. Sawdust, however, is easily obtained, and will produce a long burning log which is relatively light in weight and will produce a considerable amount of thermal energy during combustion. The synthetic log of the present invention can be used in most wood burning stoves and fireplaces that have a grate with small openings and are suitable for higher burning temperatures. Briefly, to construct the synthetic log of the present invention requires rolling paper sheet such as a used newspaper into a hollow cylinder, sealing the cylinder by folding one end of the cylinder and placing the formed cylinder into a support form. Sawdust is poured into the paper cylinder and tamped to provide a compacted solid. The filling and tamping operation are continued until the paper cylinder is substantially full. The filled paper cylinder is removed from the form and the open end is sealed by folding, both ends being fastened with tape. The completed unit is thereafter ready for use.

Referring to FIGS. 1 through 9, the artificial log of the present invention is formed by laying out a full sheet of paper such as newspaper 20 and folding the newspaper in half to a size of about 14 ¼" by 22¾". Paper cylinder mold 22 is placed at one end of folded newspaper 20 and rolled along the length of the paper so that newspaper 20 is rolled on to the paper cylinder mold 22. Once newspaper 20 is rolled fully about cylinder mold 22, excess newspaper at the end of mold 22 is folded over the end of the mold as indicated by reference numeral 24, FIG. 2. A preferred method of folding the end of paper 20 over mold 22 includes the steps of forming the first fold at seam 26, making two more folds on each side of the first fold and making the fourth fold from paper opposite the first fold. The completed folds should be flush with the end of paper cylinder mold 22 and should look similar to end 24. The result is a formed paper cylinder 28 formed about paper cylinder mold 22.

Paper cylinder 28 and mold 22 are placed into form support 30, FIG. 3 such that folded end 24 is placed against base 32. Once placed inside form support 30, form halves 34 and 36 are closed and locked together to form an outer cylinder about the surface of paper cylinder 28. FIG. 4 illustrates paper mold cylinder 22 being removed from form support 34. Paper cylinder mold 22 is preferably removed from form support 30 by pulling on tab 38 which is attached to the top portion of mold 22 in a manner discussed later. Once mold 22 is removed, paper cylinder 28 remains supported about the outside by form support 30.

FIGS. 5 and 6 illustrate the filling and compacting steps of the present invention to produce a solid artificial log. FIG. 5 illustrates the placement of funnel 40 on the top of form support 30 and which includes a support collar 42 which rests on support 30 and stabilizes funnel 40. Funnel 40 ensures that sawdust 44 is directed into the interior of paper cylinder 28. Sawdust 44 can be poured by measuring cup 46 into funnel 40. FIG. 6 illustrates the compacting step in which compacting rod 48 is pounded against the measured quantity of sawdust 44 placed into paper cylinder 28. Utilizing compacting rod 48, the sawdust is gently tamped a couple of times to shape paper cylinder 28 around support form 30. The sawdust is tamped somewhat harder to provide a compacted mass. The steps illustrated in FIGS. 5 and 6 are repeated until about four measures of sawdust 44 have been added by measuring cup 46 and tamped and compacted by compacting rod 48. Paper cylinder 28 should be substantially filled with the compacted mass of sawdust 44 before stopping the addition of sawdust and the compaction thereof. Once paper cylinder 28 is filled and sawdust 44 is fully compacted, support form halves 34 and 36 are unlocked and the filled paper cylinder 28 removed from support form 30, FIG. 7. As shown in FIG. 8, open end 50 of filled paper cylinder 28 is sealed by folding in a like manner as end 24 in which a first fold 52 is made, followed by the folding of sides 54 and 56 and the final folding of end 58. Once paper cylinder 28 is sealed at ends 24 and 50, each end can be secured by means of a piece of an adhesive tape 60 and 62 placed at ends 24 and 50, respectively. The end product is an artificial log 64 which comprises a compacted solid mass of sawdust enclosed within a tightly wound paper cylinder 28. Once ends 50 and 24 have been sealed by adhesive tape 62 and 60, log 64 is ready to be placed in a furnace or fireplace for burning.

The components of the apparatus of the present invention can be formed into a kit and used to produce a plurality of synthetic logs 64 for use in wood burning stoves, fireplaces, furnaces, etc. In FIGS. 10 and 11 is illustrated form support 30 which comprises a plywood base 32 approximately 8" square and ⅝" thick. Of course, other dimensions can be utilized with desirable results. The body of form support 30 is formed by support halves 34 and 36 which are formed from PVC pipe which has been longitudinally cut in half. When locked together, form halves 34 and 36 form a 4" inside diameter space about one foot tall. Form halves 34 and 36 are preferably about ¼" thick to provide the necessary stability and be damage resistant. Support half 34 is secured to base 32 by a pair of corner braces 66 and 68 which are secured to base 32 and attached to form support half 34 by a series of metal screws 70. Support form halves 34 and 36 are fastened to each other so that form half 36 will pivot to allow the opening of form support 30 and the insertion of paper tube 28 and paper mold 22. A standard roll hinge 72 attached at the joint between halves 34 and 36 in a conventional manner provides the pivotal movement. Several roll hinges can be fastened to each form half 34 and 36 by any conventional attaching means such as an adhesive or metal screws to provide the pivot motion. Form support 30 includes a locking mechanism 74 placed at the joint between halves 34 and 36 opposite roll hinge 72. As illustrated in FIGS. 10 and 11, locking mechanism 74 is shown containing hook base 76 secured to support half 36 by means of metal screws 78. The latching mechanism to lock form halves 34 and 36 about cylinder mold 22 and paper cylinder 28 includes a binder base 80 secured to form half 34 by a series of metal screws or other conventional attachment means. Secured to binder base 80 is a draw catch 82 containing lever 84 which pivots a binder base 80.

Latch 86 secured to draw catch 82 is able to reach hook base 76 and be tightened therearound by pressing lever 84 toward form half 34. Such a lock is conventional and does not form by itself any part of the invention. Accordingly any other type of lock which will secure form support 30 about cylinder mold 22 and paper cylinder 28 can be utilized.

FIG. 12 illustrates the structure of funnel 40 and support collar 42. Support collar 42 can be formed of any type of sturdy material such as plastic, hard board, etc. and is preferably at least about ⅛" thick. Funnel 40 is preferably made of a PVC pipe adapter including threads 88 onto which collar 42 is threaded to complete the funnel apparatus. FIG. 13 illustrates paper cylinder mold 22. The body of cylinder mold 22 is preferably formed of a piece of corrugated cardboard approximately 12" square. The cardboard square is formed into a round cylinder with the edges in engagement. A strip of adhesive tape 90 is placed along the full length of cylinder seam 92 where the edges of the cardboard meet. Seam 92 should be smooth and uniform on the exterior of cylinder mold 22 with no tape splices. Tab 38 placed on cylinder mold 22 for pulling the cylinder mold from form support 30 and rolled paper cylinder 28 can be formed from many materials and secured to the top edge portion of cylinder mold 22. A preferred method of forming tab 38 is to fold a piece of thick adhesive tape such as conventional masking tape and secure the folded edges on either side of cylinder mold 22. Tab 38 should extend about 1½" above the top edge of cylinder mold 22.

Compacting rod 48 is shown in FIG. 14. Compacting rod 48 is preferably formed from a 1¾" diameter wood dowel cut to a length of about 4'. Ends 94 and 96 are preferably rounded to provide for the best compacting results. Of course, compacting rod 48 can be formed of other materials such as metal or plastic. Measuring cup 46 can also be included in the kit and is preferably about a 30 ounce can in which the open end is squeezed slightly to form a pouring spout.

Synthetic log 64 will burn like conventional wood logs and is preferably laid flat along the fire grate or fire brick. A small fire can first be formed with paper or kindling wood with log 64 placed on top of the kindling material. Log 64 will burn from a visible flame to red hot coals and depending upon the type of combutible material which is utilized, the length of the flame and heat from the coals will vary. The present invention allows for the use of wood burning stoves or fireplaces without the nuisances of storing large amounts of cut logs and without the corresponding expense for buying and in some cases even storing natural wood logs. Synthetic log 64 can be made at the time of use in a manner of minutes by hand requiring only the storage of the combustible material which in comminuted form requires much less storage space than would a natural wood log.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A method of making a synthetic combustible log comprising; shaping a sheet of combustible material into a cylindrical shape which is capable of holding a mass of particulate combustible solid by placing one end of said sheet on a cylindrical mold, rolling said mold along the length of sheet material to form a cylindrical shape about the exterior surface of said mold, said sheet material including an end extending beyond one end of said mold and folding said extended end so as to cover an end of said mold with said sheet material, placing said mold containing said sheet material therearound within an enclosed outer cylindrical support which is placed in contact with the exterior surface of said shaped sheet material, removing said cylindrical mold while maintaining said sheet in said shaped form within said support, said shaped sheet material including one closed end and one open end, pouring said combustible material within said open end, compacting said poured material within said shaped sheet material by tamping said combustible material with an elongated compacting means, repeating pouring and compacting until said cylindrically shaped sheet material is substantially filled to form a compacted solid core within said shaped sheet material, and removing said filled shaped sheet material from said support and folding said open end to cover said core.

2. The method of claim 1 wherein each of the folded ends of said shaped sheet material are sealed with an adhesive tape.

3. A kit for forming a synthetic log comprising; a shaping means by which a sheet material can be formed into a shape including a hollow interior and including an open end, a support means in the form of an elongated hollow structure having two ends in which one end of said structure is enclosed and one end of said structure is open, said support means having a length covering substantially the entire length of said shaping means, and an elongated compacting means which has a length greater than the length of said support means.

4. The kit of claim 3 wherein said support means is a hollow cylinder including a base to form said enclosed end, said hollow cylinder is formed into two elongated halves, said halves being fastened together by a hinge means to allow said hollow cylinder to be opened along substantially its entire length, said support means includes locking means to tightly fasten said halves together to form said hollow cylinder.

5. The kit of claim 4 wherein said shaping means includes an extension placed along one end thereof so that said extension extends beyond said end.

6. The kit of claim 5 further including a funnel means.

7. The kit of claim 6 wherein said funnel means includes a collar placed about the exterior surface thereof for supporting said funnel means on the open end of said support means.

8. The kit of claim 7 wherein said compacting means is an elongated rod containing at least one rounded end.

* * * * *